US008860386B2

(12) United States Patent
Angelin

(10) Patent No.: US 8,860,386 B2
(45) Date of Patent: Oct. 14, 2014

(54) CONVERTER CIRCUIT

(71) Applicant: OSRAM GmbH, Munich (DE)

(72) Inventor: Francesco Angelin, Mogliano Veneto (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/094,849

(22) Filed: Dec. 3, 2013

(65) Prior Publication Data

US 2014/0152273 A1 Jun. 5, 2014

(30) Foreign Application Priority Data

Dec. 4, 2012 (IT) .......................... TO2012A001041

(51) Int. Cl.
*H02M 3/158* (2006.01)

(52) U.S. Cl.
USPC ............................ 323/225; 323/271; 323/284

(58) Field of Classification Search
USPC .................. 323/222, 225, 271, 282–290, 351
See application file for complete search history.

(56) References Cited

U.S. PATENT DOCUMENTS 6,469,917 B1 * 10/2002 Ben-Yaakov .................. 363/44
6,914,394 B2 7/2005 Weirich
7,684,220 B2 * 3/2010 Fang et al. .................. 363/56.1
8,199,538 B2 * 6/2012 Piper .......................... 363/21.18
8,604,767 B2 * 12/2013 Liu .............................. 323/284
2011/0140630 A1 6/2011 Doudousakis et al.

FOREIGN PATENT DOCUMENTS

EP 1376844 A2 1/2004

* cited by examiner

*Primary Examiner* — Jessica Han

(57) ABSTRACT

A converter circuit may include: a first node receiving an input voltage; a second node providing an output voltage; a first inductor between the first node and a third node; a capacitor between the third node and a first terminal of a diode, the other terminal of the diode providing said output voltage; a second inductor between the first terminal of the diode and common; an electronic switch acting between the third node and common; a first current generator acting between the first node and the switch to drive the switch to the conductive condition; and a second current generator sensitive to the current through the switch in the "on" condition and/or the output voltage on the second node, the second current generator to draw current from the first current generator to drive the switch to the non-conductive condition.

13 Claims, 2 Drawing Sheets

CONVERTER CIRCUIT

CROSS-REFERENCE TO RELATED APPLICATION

This application claims priority to Italian Patent Application Serial No. TO2012A001041, which was filed Dec. 4, 2012, and is incorporated herein by reference in its entirety.

TECHNICAL FIELD

This description relates to converter circuits (converters). Various embodiments may relate to converter circuits of the switching type e.g. with SEPIC (Single Ended Primary Inductor Converter) topology. Various embodiments may relate to converter circuits usable (e.g. as auxiliary generator) in power supplies for lighting sources, e.g. LED lighting sources.

BACKGROUND

Conventional SEPIC converters include an oscillator with respective components operating at a given frequency, possibly modulated via additional circuits.

In various solutions it is possible to realize the converter with a monolithic chip and/or by means of an integrated controller capable of implementing the oscillator, the pulse-width modulation (PWM) modulator, the output driver circuit and, possibly, the current loop system and/or an error amplifier for output voltage regulation.

In such application context the need arises of having converter circuits capable of dispensing with a dedicated oscillator and/or a specialized chip, with the possibility of employing a SEPIC topology within the framework of a self-oscillating converter including conventional active parts, such as e.g. transistors and diodes. This in order to provide an efficient structure, with a reduced number of parts and with a subsequent reduction of costs, e.g. to provide an application suitable converter in low power supplies, with a wide range of input values and a constant output voltage.

To this regard, it has been noted that integrated circuits may result unsuitable for such purposes when considering the incompatibility between their technology and the wide range of input values requested for a SEPIC application, primary aimed at generating an output voltage higher or lower than the input voltage.

To this regard, the following has also been noted:

- self-oscillating solutions have already been applied to a SEPIC topology (e.g. to produce so-called ballast or power factor correction stages) in power applications and by using specific inductors brought to saturation and/or employing a specific driving winding coupled to a power inductor to sustain (self)oscillation, and
- in such a solution, the working frequency may turn out to be variable as a function of the load and input voltage, as opposed to what might happen in converters provided with an oscillator, whose working frequency is normally fixed.

The need therefore is felt for converter circuits capable of dispensing with special (customized) inductive components with the possibility of replacing such components with active parts which may be both smaller and cheaper.

SUMMARY

A converter circuit may include: a first node receiving an input voltage; a second node providing an output voltage; a first inductor between the first node and a third node; a capacitor between the third node and a first terminal of a diode, the other terminal of the diode providing said output voltage; a second inductor between the first terminal of the diode and common; an electronic switch acting between the third node and common; a first current generator acting between the first node and the switch to drive the switch to the conductive condition; and a second current generator sensitive to the current through the switch in the "on" condition and/or the output voltage on the second node, the second current generator to draw current from the first current generator to drive the switch to the non-conductive condition.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

In the following description various specific details are illustrated directed to a thorough comprehension of various implementation examples. The embodiments may be realized without one or more of the specific details, or with other methods, components, materials, etc. In other cases, known structures, materials or operations are not shown or described in detail in order to avoid obscuring the various aspects of the embodiments. The reference to "an embodiment" within the scope of this description indicates that a particular configuration, structure or feature described in relation to the embodiment is included in at least one embodiment. Therefore, phrases such as "in an embodiment", possibly present in different places of this description do not necessarily refer to the same embodiment. Further, particular shapes, structures or features may be combined in every suitable way in one or more embodiments.

The references used herein are only for the convenience of the reader and do not therefore define the scope or range of the embodiments.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments aim at satisfying the needs previously outlined.

Various embodiments allow to achieve that object thanks to a converter circuit having the features set forth in the claims that follow.

The claims are an integral part of the technical disclosure provided herein in relation to various embodiments.

Various embodiments allow to provide a self-oscillating circuit that may be operated in a DCM (Discontinuous Current Mode) mode, with a reduced number of components, with the possibility of dispensing with an independent fixed frequency oscillator: this thanks to the fact that the (self) oscillating behaviour is intrinsically provided due to the circuit topology.

Figure 1:
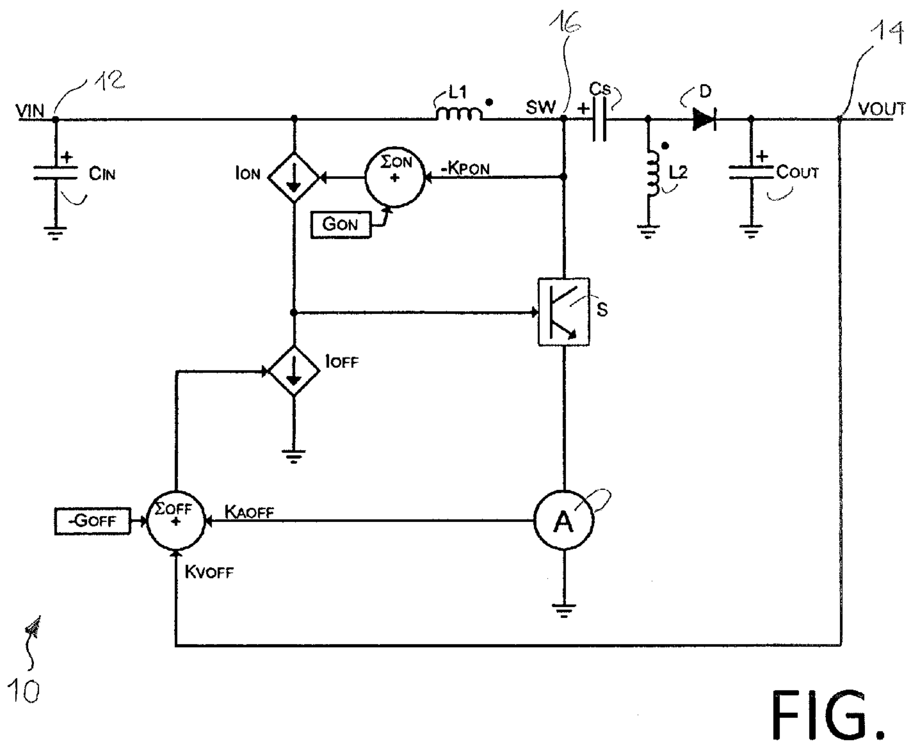
FIG. 1 shows a basic diagram of a converter circuit according to various embodiments.

The diagram of FIG. 1 illustrates an example of a converter circuit 10 based on a SEPIC (Single Ended Primary Inductor Converter) type of topology.

In various embodiments, within the framework of the circuit 10 there may be present:

- a first node 12 for receiving an input voltage $V_{IN}$,
- a second node 14 for providing a converted output voltage $V_{OUT}$,
- a first inductor L1 interposed between the first node 12 and a third node 16 capable of executing, as better illustrated below, the function of switching node or switching (SW),
- a charge capacitor Cs interposed between the third node 16 and a first terminal of a diode D whose other terminal (of diode D) provides the output voltage $V_{OUT}$,
- a second inductor L2, interposed between the first terminal of diode D and common, and
- an electronic switch S, such as e.g. a transistor, e.g. metal oxide semiconductor field effect transistor (MOSFET), bipolar junction transistor (BJT) or similar, acting between the third node 16 and common, e.g. with the interposition of an ammeter sensor A which will be better described below.

The fact of referring to a first terminal and to a second terminal of diode D (corresponding herein respectively to the anode and cathode of diode D) corresponds evidently to implementation examples in which the input voltage $V_{IN}$ and the output voltage $V_{OUT}$ are presumed positive. Various embodiments might possibly provide for the inversion of the polarities, with subsequent inversion of the connection arrangement of the diode D.

In various embodiments, the two inductors L1 and L2 may be coupled on a common core, improving some aspects of the SEPIC topology.

It will be also appreciated that the SEPIC topology and the relative operating criteria are known per se, thus making it unnecessary to provide a more detailed description herein.

Various embodiments may refer to a driver and control technique capable, e.g., of operating the converter 10 in a critical current mode, that is at the borderline between a discontinuous current (DCM) and the continuous (CCM) mode, where reference is made herein to the current in the components capable of providing a switching function tather than to the current in each inductor L1, L2.

The discontinuous current mode (DCM) entails the presence of a dead-time wherein none of the "power" elements (switch S and diode D) conduct current. During this time the current is usually non-null in the inductors, and a dampened voltage oscillation may appear at the switching node 16. The limit for this time to tend to zero defines the so called "critical" (BCM—Boundary Current Mode) operating mode.

Various embodiments may provide for the turning-on/turning-off drive of the switch S by a first current generator $I_{ON}$ and a second current generator $I_{OFF}$, which in the following will also be referred to as turning-on generator $I_{ON}$ and turning-off generator $I_{OFF}$, respectively.

In various embodiments, the first current generator $I_{ON}$ may be a latched type current generator acting between the first node 12 and the switch S bringing the switch S in the conducting condition ("on"), wherein the current through the switch S rises, the first inductor L1 charges and the capacitor Cs discharges in the second inductor L2.

The second current generator $I_{OFF}$ acts as a sink current generator controlled by at least one (and, in various embodiments, both) of the current flowing through the switch S in the condition in which this is electrically conductive ("on") and the output voltage $V_{OUT}$ on the second node 14.

This allows the turning-off generator $I_{OFF}$ to be able to draw current from the other current generator, that is the turning-on generator $I_{ON}$, in order to bring the switch S to a non-conductive condition ("off"), wherein the current in diode D starts dropping to zero until the voltage on the third node 16 also drops in order to activate (again) the turning-on generator $I_{ON}$ and bring back (again) the switch S in the conductive condition ("on"), thus restarting the duty cycle just described, by determining the self-oscillation of the converter circuit 10.

In various embodiments, self-sustained oscillation of circuit 10 may be related to the fact that the turning-on generator $I_{ON}$ is of the latched type and drives the switch S ensuring that this performs a regenerative action.

In various embodiments, such a regenerative action may occur by driving the generator $I_{ON}$ via a node or summing block $\Sigma_{ON}$ into which there flows a component $K_{PON}$ (with negative sign) proportional to the voltage on node SW 16, that is on the collector of switch S driven by the current generator $I_{ON}$.

It will be appreciated that, in various embodiments, it is therefore possible to give rise to a regenerative action (that is with a final positive effect) since a high driver voltage in the generator $I_{ON}$ closes the switch that lowers the node S voltage, and therefore the latter has its sign inverted ($-K_{PON}$) so that the final sign is positive: in brief, the switch S has an inverting action that is reversed to have a positive feedback.

In various embodiments, into the above mentioned summing node $\Sigma_{ON}$, there is also applied a reference (voltage) $G_{ON}$ capable of providing an offset for initially starting the switch S and starting the latch mechanism, which is determined precisely in the positive feedback loop formed by the generator $I_{ON}$, by the switch S and by the summing node) $\Sigma_{ON}$.

As already said, when the switch S is in the "on" condition, that is electrically conductive, the current through the switch S starts rising, charging the inductor L1 and discharging the capacitor Cs in the inductor L2 (this being one of the states in the SEPIC topology).

The intensity of the current flowing through the switch S when this is conductive ("on") is detected via an ammeter sensor A, e.g. a resistor interposed in the connection between the switch S and common (or ground) and supplied to a further block or summing node $\Sigma_{OFF}$.

The summing node $\Sigma_{OFF}$ may also receive, besides a proportional component $K_{VOFF}$ of the output voltage $V_{OUT}$ detected on the second node 14, also a negative reference $G_{OFF}$, with a regulation function: e.g. the reference signal $G_{OFF}$, with negative sign, may fix the peak current level of the control related to the output voltage.

When the output signal from the summing node $\Sigma_{OFF}$ is positive, the generator $I_{OFF}$ starts draining current from the generator $I_{ON}$ determining the (re)opening of the switch S, that passes to the "off" condition, that is non-conductive.

In such conditions, the voltage on node 16 (node SW) rises to a value $V_{IN}+V_{OUT}$ (according to the behaviour of the SEPIC configuration) in order to block ("latch") at "off" (non-conductive condition) the switch S, since the generator $I_{OFF}$ is "blocked" to produce little current, not capable of switching on the switch.

This condition remains until the current in the inductors L1+L2 (that is the current through the diode D) falls to zero, causing the voltage on node 16 (node SW) to start dropping until triggering the generator $I_{ON}$, in order to close again (that is bringing back to the conductive condition) the switch S.

This type of behaviour may be defined as a limit behaviour between a continuous current mode and a discontinuous current mode (BCM).

By adding (with the criteria better described below) a dead time (that is a delay) T between when the diode D current arrives at zero and the (re)start, that is the new passage to conduction, of the switch S it is possible to pass to a discontinuous current mode or DCM operating mode.

This may offer the advantage of limiting the frequency span of the converter, ensuring a high efficiency also for reduced loads.

As already said, once the switch S is again closed, the oscillation cycle restarts, carrying out the switching sequence related to the various typical states of the SEPIC topology, according to criteria di per se known.

The diagram of FIG. 1 highlights the fact that, in various embodiments, respective stabilizing capacitors $C_{IN}$ and $C_{OUT}$ may be associated to the input node 12 and/or the output node 14.

The diagram of FIG. 2 (wherein parts and components similar or equivalent to those already described with reference to FIG. 1 are indicated with the same references and will not be described again) reproduces the diagram of FIG. 1 by highlighting the possibility, for various embodiments, of including components and functions previously not mentioned.

Figure 2:
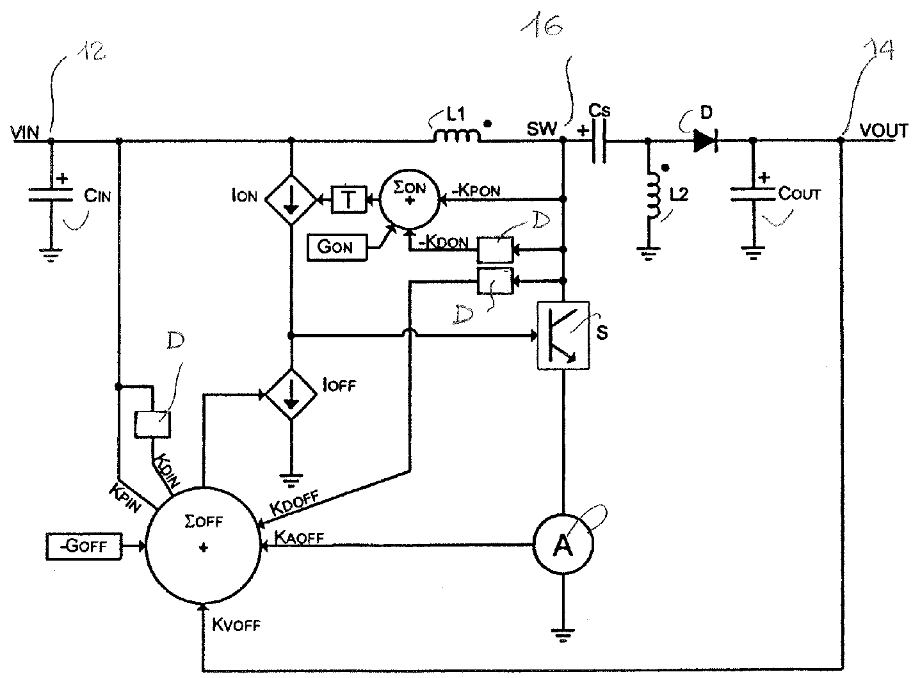
FIG. 2 shows possible developments of various embodiments.

For example, the diagram of FIG. 2 indicates la possibility of applying to the summing node $\Sigma_{ON}$ that drives the turning-on current generator $I_{ON}$, besides the proportional component $K_{PON}$ of the voltage on node 16 (node SW), also a component of a derivative type $K_{DON}$. This derivative signal (also added to node $\Sigma_{ON}$ with negative sign, as well as the proportional component $K_{PON}$) allows having a more rapid behaviour of the turning-on generator $I_{ON}$, improving the conversion efficiency.

Also, FIG. 2 highlights the possibility, already cited previously, of interposing on the control chain of the turning-on generator $I_{ON}$, a delay block T capable of determining an operation of the converter in a discontinuous current mode or DCM.

The use of such delay block T is optional, and in the absence of block T the converter operates in a borderline mode between a continuous mode and a discontinuous mode (BCM).

Further referring to the other summing node $\Sigma_{OFF}$, meant to drive the turning-off generator current $I_{OFF}$, the diagram of FIG. 2 illustrates the possibility of inserting in the above mentioned node, besides the component $K_{AOFF}$ relative (proportional) to the current that flows through the switch S when this is in conduction ("on") and the component $K_{VOFF}$ (proportional) of the output voltage $V_{OUT}$, also a derivative component $K_{DOFF}$ of the voltage present on node 16 (node SW).

This signal of a derivative nature allows also in this case a more rapid behaviour of the turning-off generator $I_{OFF}$ in order to improve the conversion efficiency.

Also, the diagram of FIG. 2 illustrates the possibility of inserting in the summing node $\Sigma_{OFF}$ two components, respectively one proportional $K_{PIN}$ and the other derivative $K_{DIN}$, of the input voltage $V_{IN}$.

The proportional component $K_{PIN}$ of the input voltage allows to displace the current peak according to the input voltage (the fixed reference signal $G_{OFF}$, with negative sign, fixes the level of the peak current of the control referred to the output voltage); this originates a feed-forward action that improves the regulation and reduces the maximum peak current reachable when the required output voltage has not been yet reached (e.g. when, as it happens in the starting condition of the circuit, the regulation function of the voltage is not yet completely efficient).

The derivative component $K_{DIN}$ allows to dynamically reduce the switching peak current during the start-up, allowing "soft start" operation.

The various blocks indicated with D in the diagram of FIG. 2 indicate blocks/modules capable of carrying out (in any known mode) a derivative function.

Various embodiments may therefore provide a mixed control in terms of peak current and output voltage, with the possible addition of a feed-forward action starting from the input voltage, with the two loops of current and voltage not necessarily nested into each other as may occur in such switching type and high performance power supplies.

In various embodiments, the above mentioned loops may be combined in a simpler way in order to originate a robust and stable control, without otherwise penalizing in an appreciable manner output voltage precision.

Figure 3:
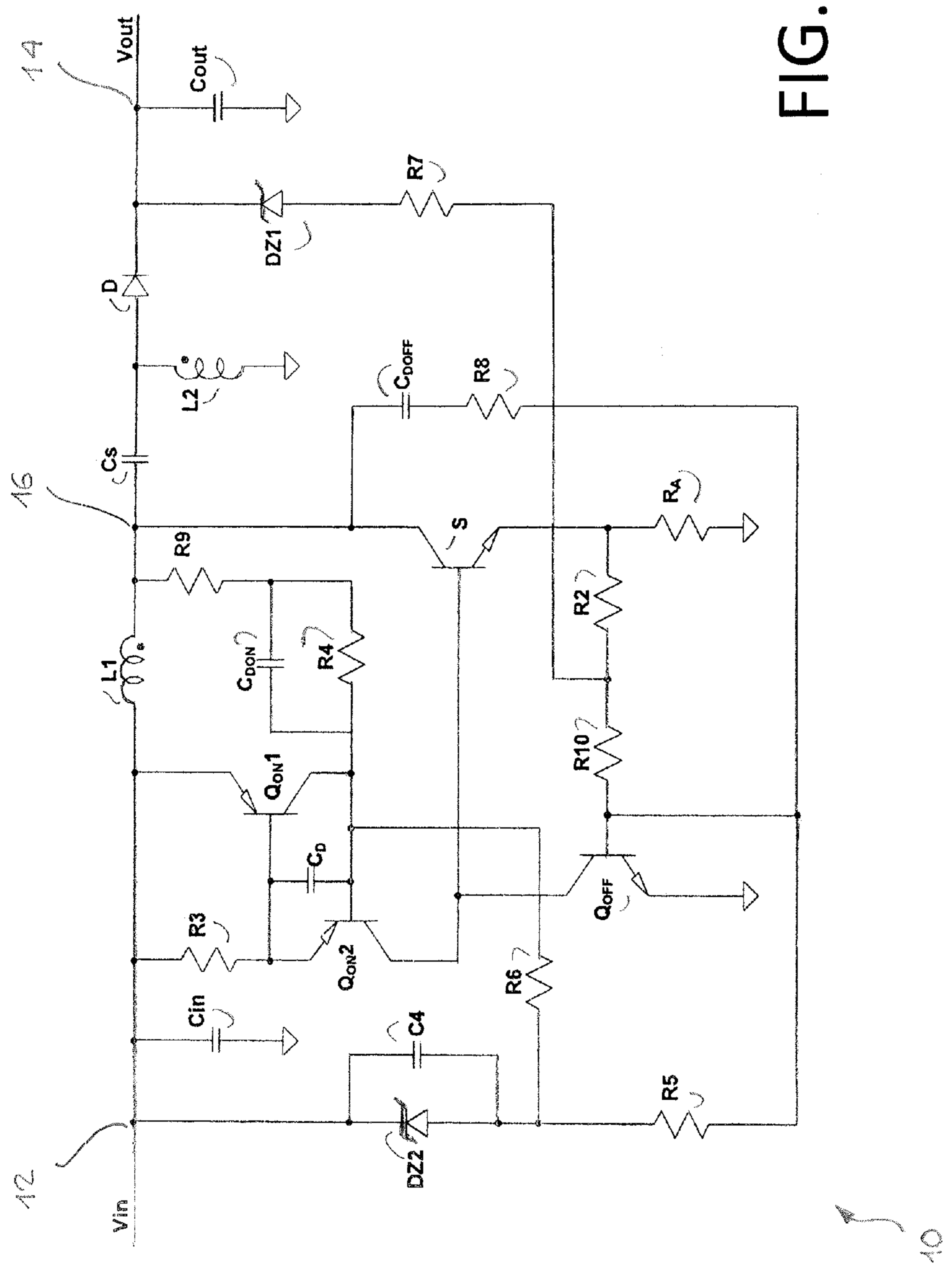
FIG. 3 shows a circuital diagram of various embodiments.

Even if the functional diagrams of FIG. 1 and FIG. 2 may appear to amount to a complex structure, various embodiments are capable of being produced with a reduced number of components: evidence of this is provided, for example, by the circuital diagram of FIG. 3.

In the diagram of FIG. 3 (where once more parts and elements similar and equivalent to those already described with reference to FIG. 1 and FIG. 2 are indicated with the same references that already appear in such previous figures), a possible embodiment is exemplified wherein:

- the turning-on current generator (that is $I_{ON}$) is realized with a known topology, via two bipolar transistors $Q_{ON}$1 and $Q_{ON}$2 having a capacitor $C_D$ interposed between their bases which is capable of implementing the delay T, together with a resistor R3,
- the signal paths for the components $K_{PON}$ and $K_{DON}$ are provided via two resistors R4 and R9 plus a capacitor $C_{DON}$ (that realizes the derivative function),
- the turning-off current generator $I_{OFF}$ is provided via a transistor $Q_{OFF}$ with the base-emitter voltage $V_{BE}$ that constitutes part of the block identified with $G_{OFF}$ of FIG. 1 and FIG. 2,
- the reference $R_A$ indicates a shunt resistor acting as an ammeter sensor A of the current flowing through the switch S,
- two resistors R2 and R10 provide the signal path for the component $K_{AOFF}$,
- the path of the derivative component $K_{DOFF}$ is provided via a resistor R8 and a capacitor $C_{DOFF}$, that provides the derivative function,
- the signal component $K_{VOFF}$ is provided with a resistor R7 and a Zener diode DZ1 (with the function of the Zener diode that could be seen as part of block $G_{OFF}$, being, on the other hand, simpler to arrange than a voltage reference element on the output side in order to improve the voltage regulation);

the path of the proportional component $K_{PIN}$ is provided by a resistor R5 plus a further Zener diode DZ2, the capacitor C4 provides the soft start derivative component $K_{DIN}$, the reference generator $G_{ON}$ is provided via a Zener diode DZ2, a capacitor C4 and a resistor R6, with the capacitor C4 capable of carrying out the function of both a stabilizing element and soft start capacitor for the turning-on generator block $I_{ON}$, and the resistor R9, a capacitor $C_{DON}$ and a resistor R8 together with the capacitor $C_{DOFF}$ are capable of acting as "snubbers" for the SEPIC configuration.

In various embodiments it is possible to replace the Zener diode DZ1 with an error amplifier, such as e.g. a transistor with a reference, that is an integrated circuit (e.g. LM431). In this way the voltage loop may be seen as an external loop that sets the reference for the internal loop of current based on the ammeter measure (A, $R_A$) of the current through the switch S.

Various embodiments allow therefore to realize a converter with a SEPIC topology with a simple structure with a reduced number of components, also in the case of more sophisticated embodiments as exemplified in FIG. 2.

In various embodiments, the input voltage may be limited only by the specifications (rating) of the active elements of the base structure, with the subsequent possibility of ensuring a wide range for the input power supply without incurring in the typical limitations of the monolithic solutions.

Various embodiments may dispense with an auxiliary voltage and operate with power auto-absorption much reduced.

In various embodiments the frequency is capable of automatically adapting to various load conditions and a simple capacitor, when used as a delay line T of FIG. 2, may allow a DCM operation in order to limit the frequencies field.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A converter circuit, comprising:

a first node for receiving an input voltage;

a second node for providing an output voltage;

a first inductor interposed between the first node and a third node;

a capacitor interposed between the third node and a first terminal of a diode, the other terminal of the diode providing said output voltage;

a second inductor interposed between the first terminal of the diode and common;

an electronic switch acting between the third node and common, the electronic switch switchable between a conductive "on" condition and a non-conductive "off" condition;

a first current generator acting between the first node and the switch to drive the switch to the conductive "on" condition wherein the current through the switch increases, the first inductor charges and the capacitor discharges into the second inductor; and a second current generator sensitive to at least one of the current through the switch in the "on" condition and the output voltage on the second node, the second current generator to draw current from the first current generator to drive the switch to the non-conductive "off" condition, wherein the voltage at the third node drops to trigger the first current generator to drive the switch to the conductive "on" condition, thereby producing self-oscillation of the converter circuit.

2. The converter circuit of claim 1, wherein the second current generator is sensitive both to the current through the switch in the "on" condition and the output voltage on the second node.

3. The converter circuit of claim 1, wherein at least one of the first current generator and the second current generator is sensitive to a respective reference voltage to control self-oscillation of the converter circuit.

4. The converter circuit of claim 1, wherein at least one of the first node and the second node has coupled therewith a respective stabilizer capacitor.

5. The converter circuit of claim 1, wherein the first current generator is sensitive to the voltage at the third node.

6. The converter circuit of claim 5, wherein the first current generator is sensitive to the voltage at the third node via a proportional-derivative network.

7. The converter circuit of claim 1, further comprising:

a delay block acting on the first current generator to produce discontinuous current mode operation of the converter circuit.

8. The converter circuit of claim 1, wherein the second current generator is sensitive to the voltage on said first node.

9. The converter circuit of claim 8, wherein the second current generator is sensitive to the voltage on said first node via a proportional-derivative network.

10. The converter circuit of claim 1, wherein the second current generator is sensitive to the voltage on said third node.

11. The converter circuit of claim 10, wherein the second current generator is sensitive to the voltage on said third node via a derivative network.

12. The converter circuit of claim 1, further comprising:

an output voltage regulator coupled to the second node, the output voltage regulator including a Zener diode.

13. The converter circuit of claim 1, further comprising:

an output voltage regulator coupled to the second node, the output voltage regulator including an error amplifier.

* * * * *